United States Patent [19]
Moriyama et al.

[11] Patent Number: 5,143,167
[45] Date of Patent: Sep. 1, 1992

[54] FOUR-WHEEL-DRIVE MOTOR VEHICLE OF TRANSVERSELY-DISPOSED ENGINE TYPE

[75] Inventors: Naomune Moriyama; Takahito Yokouchi; Reiji Kikuchi, all of Yokohama; Koichi Yamamoto, Hiroshima; Hideaki Akaboshi, Hiroshima; Ayumu Doi, Hiroshima; Masaki Kadokura, Hiroshima, all of Japan

[73] Assignee: Mazda Motor Corporation, Hiroshima, Japan

[21] Appl. No.: 577,972

[22] Filed: Sep. 4, 1990

[30] Foreign Application Priority Data

Sep. 4, 1989 [JP] Japan .................. 1-229942
Nov. 30, 1989 [JP] Japan .................. 1-311853

[51] Int. Cl.⁵ .......................................... B60K 17/344
[52] U.S. Cl. ........................... 180/248; 180/297
[58] Field of Search ............. 180/247, 248, 249, 250, 180/291, 292, 297, 374, 376, 375, 299

[56] References Cited

U.S. PATENT DOCUMENTS 3,580,350  5/1971  Arkus-Duntov .................... 180/292
4,716,984  1/1988  Hiramatsu et al. ................ 180/297
4,951,964  8/1990  Sakamoto et al. ................ 180/376
5,083,478  1/1992  Hiraiwa ............................ 180/247

FOREIGN PATENT DOCUMENTS 60-179333  9/1985  Japan .
 0097428  4/1988  Japan ............................. 180/249
63-23219   6/1988  Japan .
63-103735  9/1988  Japan .

Primary Examiner—Kenneth R. Rice
Assistant Examiner—Anne Boehler
Attorney, Agent, or Firm—Sixbey, Friedman, Leedom & Ferguson

[57] ABSTRACT

In a four-wheel-drive motor vehicle of transversely-disposed engine type, an engine and a transmission are disposed so as to be longitudinally offset from each other and to locate a gravitational center thereof in a rearward position of an axle of front wheels, and in addition an output shaft of the transmission and a center differential are disposed coaxially. With this arrangement, imbalanced weight distribution of the vehicle body on front wheels can be corrected, and a longitudinally-compact layout of the power transmission device can be obtained. Further, a height of a bonnet can be lowered.

22 Claims, 15 Drawing Sheets

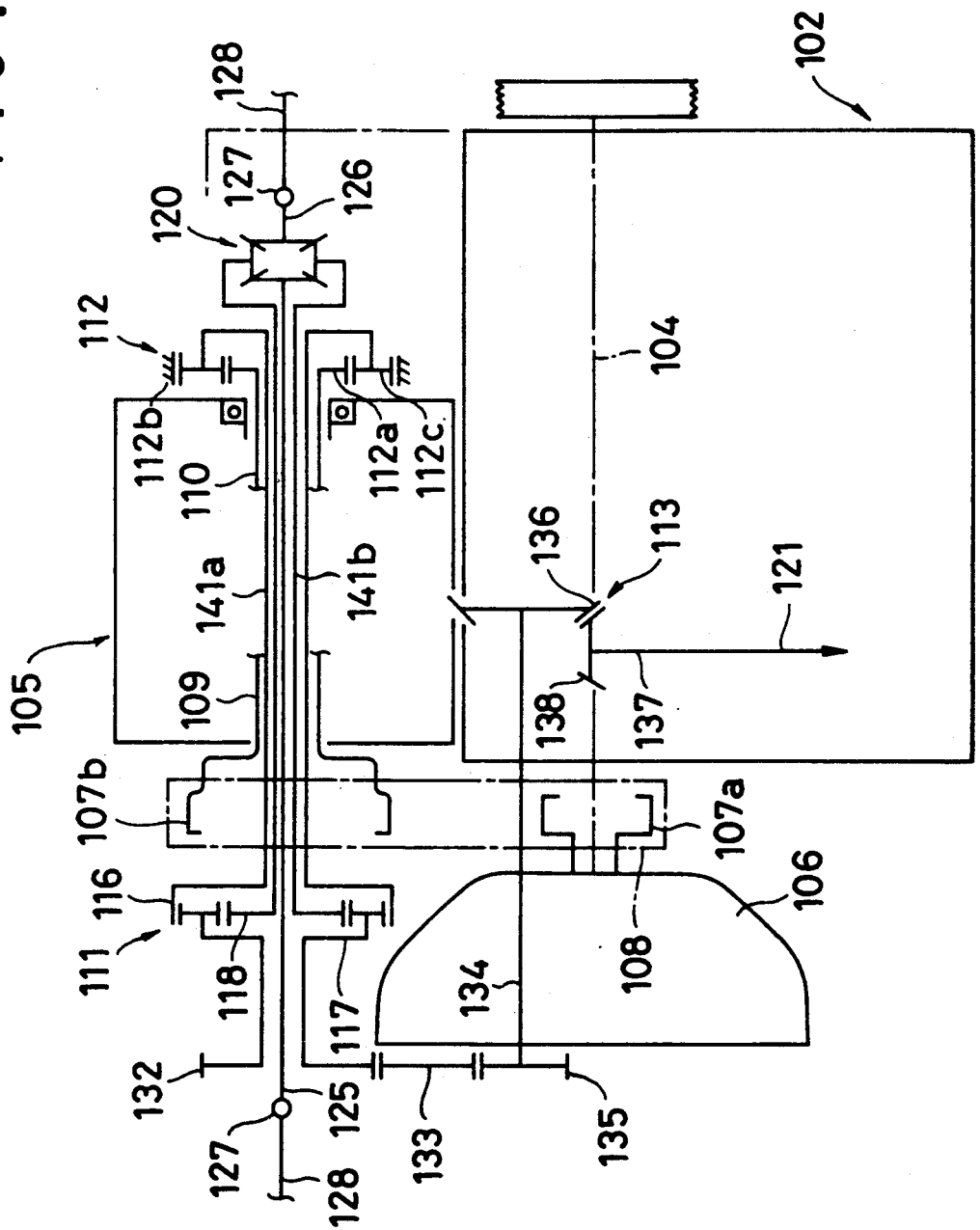

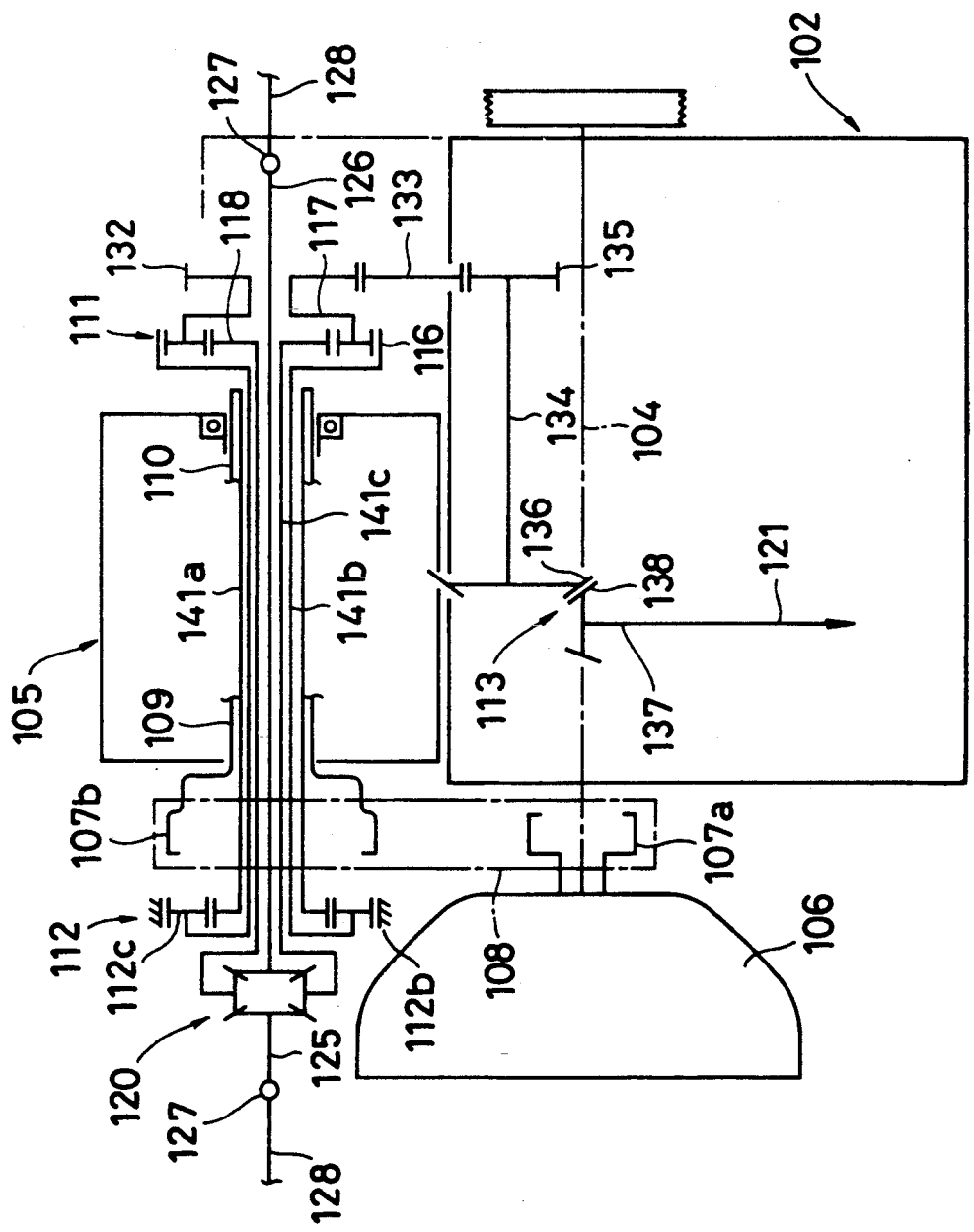

FOUR-WHEEL-DRIVE MOTOR VEHICLE OF TRANSVERSELY-DISPOSED ENGINE TYPE

BACKGROUND OF THE INVENTION

1. Field of the Invention

This invention relates to a four-wheel drive motor vehicle of transversely-disposed engine type wherein an engine is disposed transversely at the front part of the vehicle body.

2. Description of the Prior Art

In a four-wheel-drive motor vehicle of transversely-disposed engine type, generally an engine and a transmission are disposed so as to be coaxial on an axis of the widthwise direction of the vehicle body and to locate the gravitational center thereof (a power unit center) in the forward position of an axle of front wheels. However, this arrangement results in an imbalanced weight distribution in the vehicle with an excessive load acting upon the front wheels. Consequently, running stability of the vehicle will deteriorate. Especially with recent popularity of more and more powerful engines, this problem of imbalanced weight distribution to front wheels has been troublesome.

Japanese Patent Application Laying open Gazette No. 63-103735 discloses one of the measures to releive the problem of an excessive load on front wheels. In this application, an engine and a transmission are disposed so as to be longitudinally offset from each other and to locate the gravitational center thereof in the rearward position of an axle of front wheels.

By the way, four-wheel-drive motor vehicles are usually divided into two types, namely, one which includes a center differential and one which does not. (Above-mentioned Japanese Patent Application Laying open Gazette No. 63-103735 belongs to the latter type.) This center differential distributes driving torque from a transmission to a front wheel side and a rear wheel side. In the case of a four-wheel-drive motor vehicle having a center differential, the center differential is generally disposed coaxially with a front differential on an axis of the widthwise direction of the vehicle body, i.e. on an axle line of front wheels (refer to Japanese Patent Application Laying Open Gazettes No. 57-186522 and No. 59-176120). This front differential is to distribute driving torque from the center differential to the right and left front wheels However, when setting the power unit center in the rearward position of the front axle, problem arises in this four-wheel-drive motor vehicle having the center differential. In order to dispose shafts for transmitting the driving torque from the center differential to the rear wheel side in the lower position of a transmission, the transmission and the engine must be located in relatively higher position. This requires a bonnet to be set in an unfavorably higher position.

SUMMARY OF THE INVENTION

An object of the present invention is to provide a four-wheel-drive motor vehicle of transversely-disposed engine type having a center differential which, when setting the power unit center in the rearward position of the front axle, can realize balanced weight distribution of the vehicle between the front and rear wheels, without requiring higher bonnet position, by properly setting a position of the center differential.

In order to attain the above object, the present invention provides a four-wheel-drive motor vehicle wherein an engine and a transmission are disposed so as to be longitudinally offset from each other and to locate the gravitational center thereof in the rearward position of an axle of front wheels, and in addition an output shaft of the transmission and a center differential are disposed coaxially.

This arrangement can correct imbalanced weight distribution of the vehicle on the front wheels since the gravitational center of the engine and the transmission, or the power unit center, is located in the rearward position of the front axle. Further, the center differential is disposed coaxially with the transmission in the present invention. Accordingly, it is not necessary to locate the transmission and the engine in the higher position in order to avoid an interference with a shaft for transmitting the driving torque from the center differential to the rear wheel side. As a result, height of the bonnet can be set lower.

The above and other objects, features and advantages of the present invention will be understood more clearly by reading the following description of preferred embodiments, with reference to the accompanying drawings.

BRIEF DESCRIPTION OF THE DRAWINGS

The attached drawings show preferred embodiments of the present invention.

FIGS. 1 through 3 show the first embodiment of the present invention in which:

FIG. 1 is a schematic drawing showing an overall construction of a four-wheel-drive motor vehicle;

FIGS. 2 and 3 are a plan view and a side view respectively, each showing a layout of an engine etc. at the front part of the vehicle body.

FIGS. 4 through 6 show the second embodiment of the present invention, in which:

FIG. 4 is a view corresponding to FIG. 1;

FIG. 5 is a view corresponding to FIG. 2;

FIG. 6 is a view corresponding to FIG. 3.

FIGS. 7 through 8 show the third embodiment of the present invention, in which:

FIG. 7 is a partial cross sectional plan view showing a main part of a power transmission system of the four-wheel-drive motor vehcle;

FIG. 8 is a view corresponding to FIG. 7, but showing a side view thereof.

FIG. 9 through 17 are schematic plan views, each showing a main construction of a power transmission system of the four-wheel-drive motor vehicle in accordance with the fourth through twelfth embodiment of the present invention.

DETAILED DESCRIPTION OF THE INVENTION

Preferred embodiments of the present invention are now described with reference to the accompanying drawings.

Figure 1:
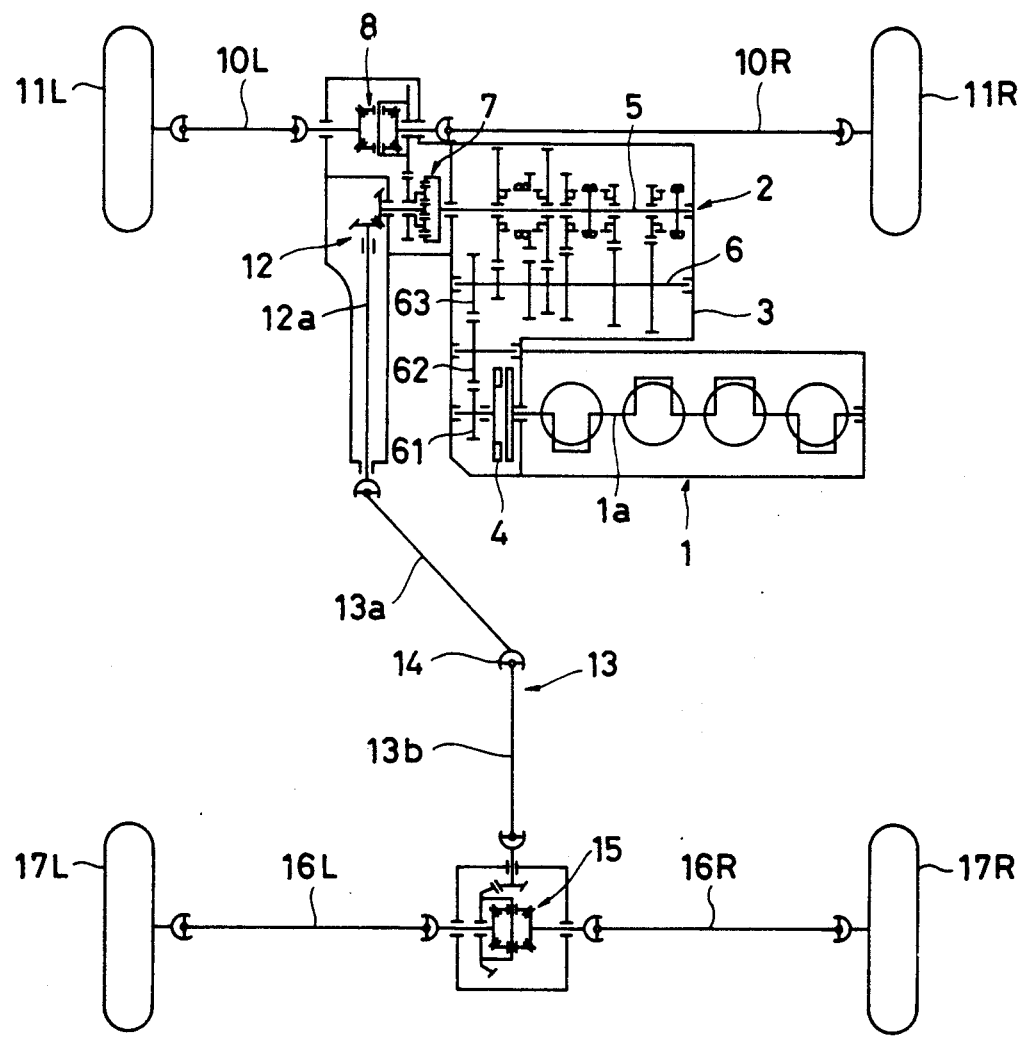

FIG. 1 shows an overall rough composition of a four-wheel-drive mechanism in accordance with the first embodiment of the present invention. Reference numeral 1 designates a 4-cylinder engine mounted at the front part of the vehicle body. The engine 1 is transversely disposed so as to locate a crank shaft 1a, an outut thereof, in the widthwise direction of the vehicle body. Reference numeral 2 designates a gear type transmission which is mounted transversely in front of the engine 1. The transmission 2 is constituted in such a way that a main shaft 5 and a counter shaft 6 are arranged in parallel inside a casing 3. The transmission 2 changes over a gear ratio, or a transmission ratio, by switching a gear transmission channel between the shafts 5 and 6. A driving torque of the engine 1 is transmitted from an output gear 61, which is disposed coaxially with the crank shaft 1a, to the counter shaft 6 of the transmission 2 through an idle gear 62 and an input gear 63. A clutch 4 is interposed between the output gear 61 and the crank shaft 1a of the engine 1. Thus, the counter shaft 6 constitutes an input shaft, and the main shaft 5 constitutes an output shaft.

Reference numeral 7 designates a center differential for distributing the driving torque from the transmission 2 to the front and rear wheel sides. Reference numeral 8 designates a front differential for distributing a part of the driving torque from the center differential 7 to right and left wheels 11L and 11R through axle shafts 10L and 10R. The center differential 7 comprises a planetary gear type differential, and the front differential 8 comprises a helical gear type differential. The center differential 7 is disposed coaxially with the main shaft 5 which functions as an output shaft of the transmission 2. The engine 1 and the transmission 2 are located in the rearward position of the axle shafts 10L and 10R of the front wheels.

Reference numeral 12 designates a transfer mechanism which transmits the remaining driving torque from the center differential 7 to a longitudinally-extending propeller shaft 13. The propeller shaft 13 comprises a plurality (two in the drawings) of shafts 13a, 13b which are interconnected through a universal joint 14. A rear end of the propeller shaft 13 (the shaft 13b) is interconnected with a rear differential 15. This rear differential 15 of a helical gear type distributes the driving torque to right and left rear wheels 17L and 17R through axle shafts 16L and 16R.

Figure 2:
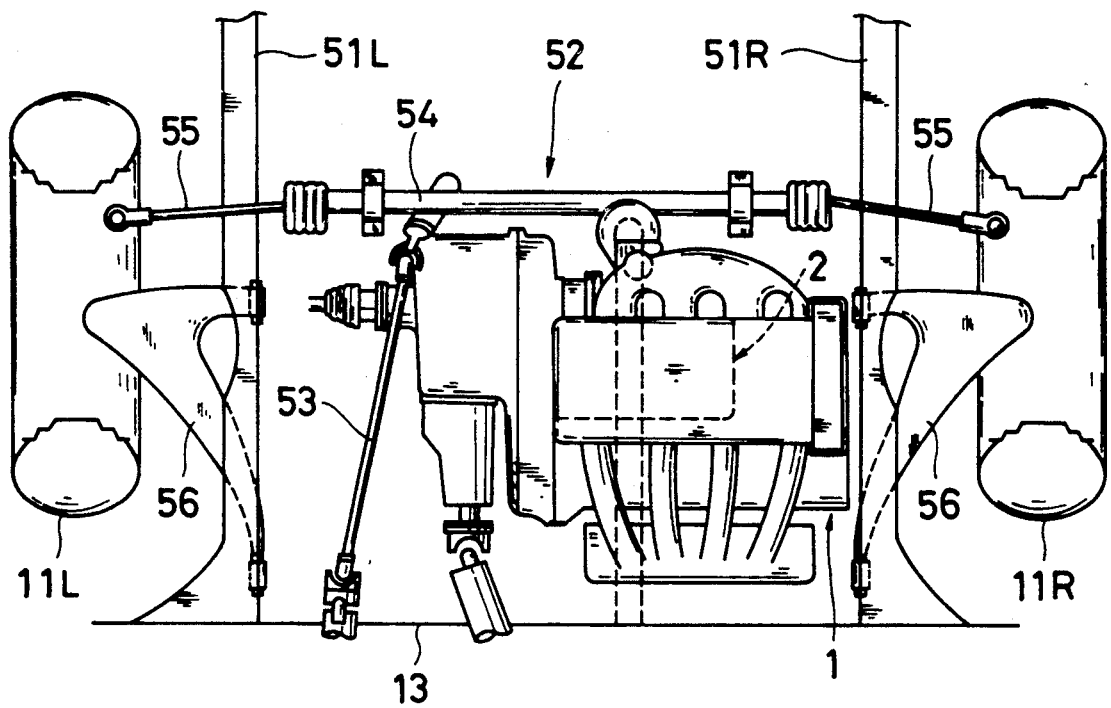
Figure 3:
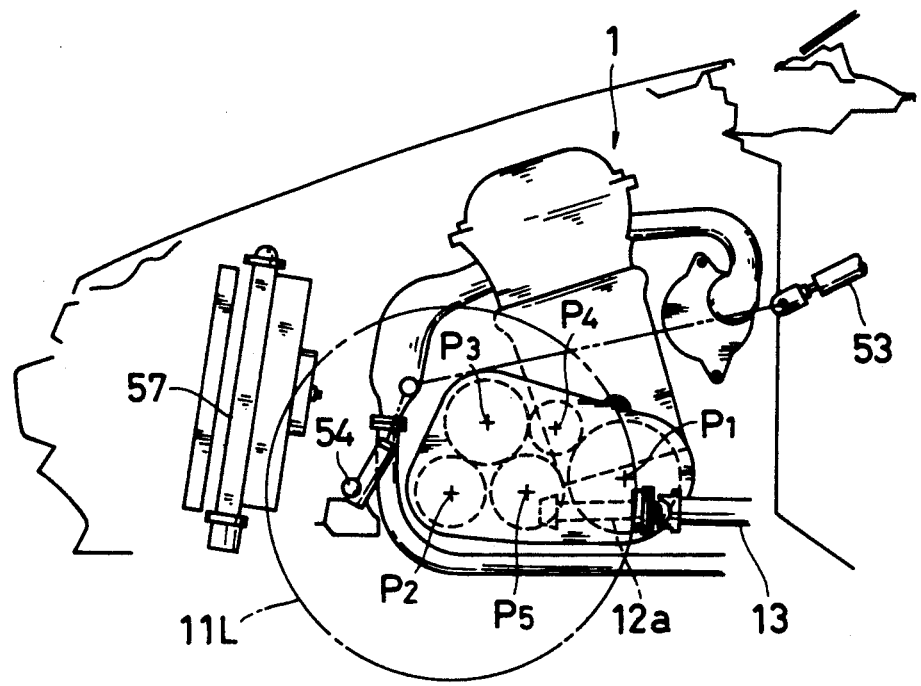

FIGS. 2 and 3 show a layout of the engine 1 and the transmission 2. In FIGS. 2 and 3, the engine 1 and the transmission 2 are supported on front frames 51L and 51R. An axial center P1 of the crank shaft 1a of the engine 1 is located almost at the same height as an axial center P2 of the axle shafts 10L and 10R of the front wheels 11L and 11R (center of the front differential 8) and located in the rearward position of the axial center P2. An axial center P3 of the counter shaft 6 of the transmission 2 is located between the axial center P1 of the crank shaft 1a and the axial center P2 of the axle shafts 10L and 10R in the longitudinal direction and located in the upper position of these axial centers P1 and P2. An axial center P4 of the idle gear 62 is located between the axial center P3 of the counter shaft 6 and the axial center P1 of the crank shaft 1a.

An axial center of the main shaft 5 of the transmission 2 and a center P5 of the center differential 7 which is coaxially disposed therewith, are located in the lower position between the axial center P3 of the counter shaft 6 and the axial center P4 of the idle gear 62. A shaft 12a of the transfer mechanism 12 and the propeller shaft 13 extend almost horizontally toward the rear of the vehicle body from a slightly lower position of the center P5 of the center differential 7. When viewed in plane, the shaft 12a extends longitudinally on the right side of the engine 1.

Referring to FIGS. 2 and 3, reference numeral 52 designates a steering mechanism. The steering mechanism 52 transmits a steering force of a steering wheel (not shown in the drawings) to the right and left front wheels 11L and 11R through a steering shaft 53, a rack and pinion mechanism 54 and tie rods 55, 55 etc. in order to steer the front wheels 11L and 11R to the right or left. Reference numerals 56 and 57 designate a suspension arm for interconnecting the front wheels 11L and 11R with the vehicle body (front frames 51L and 51R), and a radiator respectively.

To sum up the features of the first embodiment of the present invention, the transmission 2 is located in the rearwrd direction of the axial center of the axle shafts 10L and 10R of the front wheels, namely, the center P2 of the front differential 8, and the engine 1 is located in the rearward position of the transmission 2. As a result, the gravitational center of the engine 1 and the transmission 2, or the power unit center, is located apart from the axial center P2 of the front axle shafts 10L and 10R toward the rear of the vehicle body. This means that imbalanced weight distribution on the front wheels 11L and 11R can be substantially corrected, thereby improving stability of the vehicle.

the center differential 7 is disposed coaxially with the main shaft 5 of the transmission 2. The transfer mechanism 12 for transmitting the driving torque from the center differential 7 to the rear wheel side is disposed on one side of the casing 3 of the transmission 2. Accordingly, it is not required to dispose the transmission 2 and the engine 1 in the relatively higher position in order to avoid an interference with this transfer mechanism 12. This makes possible to lower the height of the bonnet. Another advantage is that coaxial positional relation between the transmission 2 and the center differential 7 assures that these power transmission devices do not extend considerably in the longitudinal direction of the vehicle body, and thus realizing a compact power transmission devices.

Figure 4:
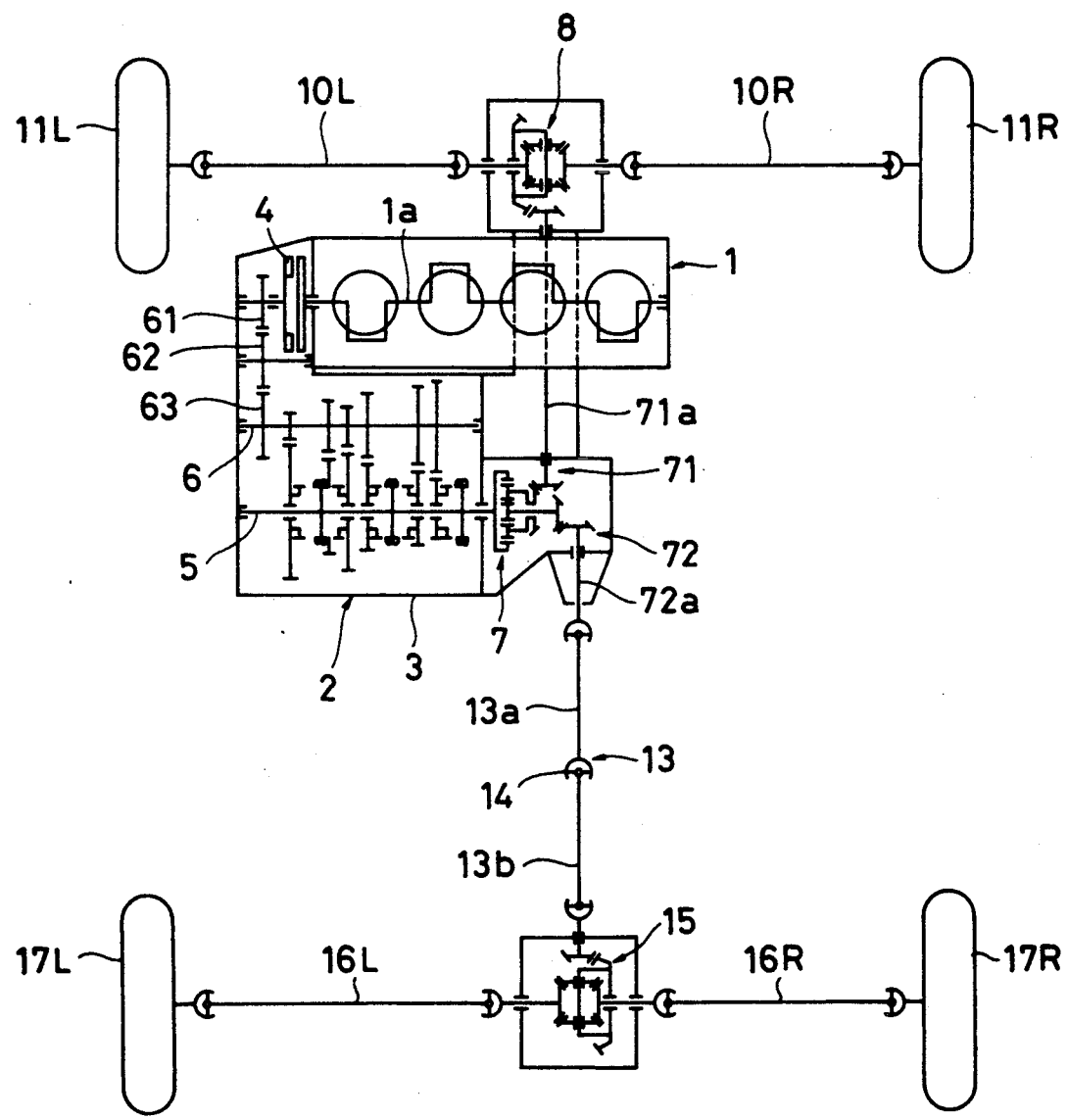

FIG. 4 shows a four-wheel-drive device in accordance with the second embodiment of the present invention. In this four-wheel-drive device, a positional relation between an engine 1 and a transmission 2 is longitudinally opposite from the positional relation in the first embodiment. In detail, an engine 1 is disposed in the rearward position of a front differential 8 which is located on an axis of axle shafts 10L and 10R of front wheels 11L and 11R. A transmission 2 is disposed in the rearward position of this engine 1.

A center differential 7 is disposed coaxially with a main shaft 5 of the transmission 2. With this arrangement, a part of the driving torque distributed by the center differential 7 is transmitted to the front differential 8 by means of a transfer mechanism 71 for front wheels, while the remaining driving torque is transmitted to a rear differential 15 by means of a transfer mechanism 72 for rear wheels and a propeller shaft 13. Construction of other parts in this four-wheel-drive device is substantially the same as in the case of the first embodiments. Therefore, same reference numerals are given to corresponding parts in the second embodiment and explanation thereof is omitted.

Figure 5:
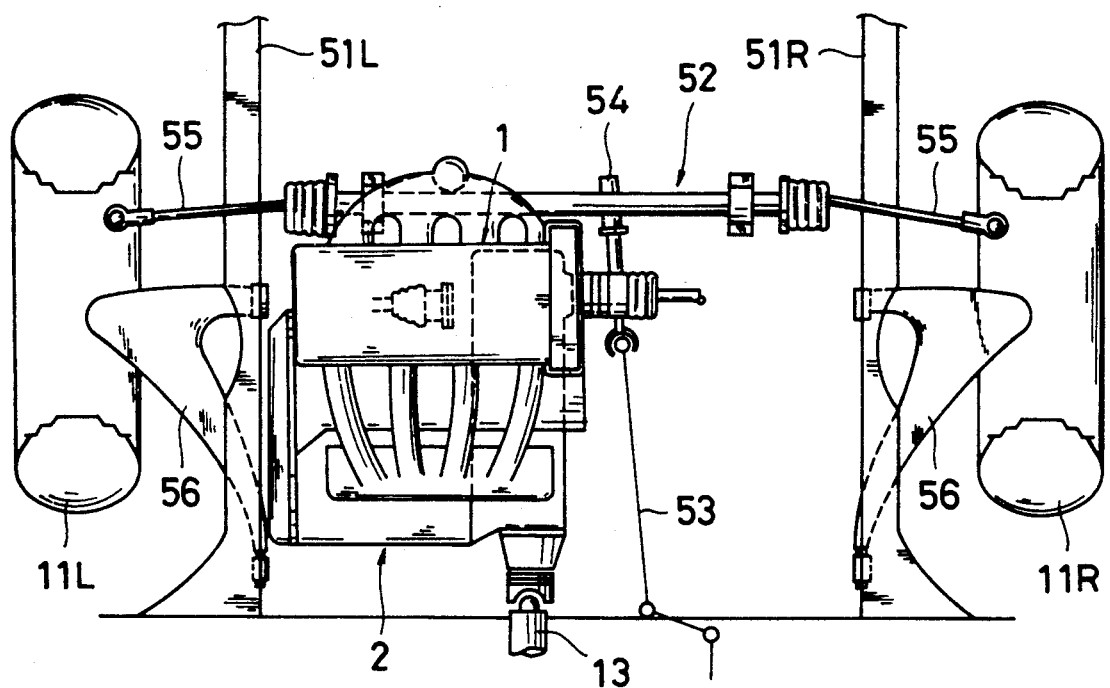
Figure 6:
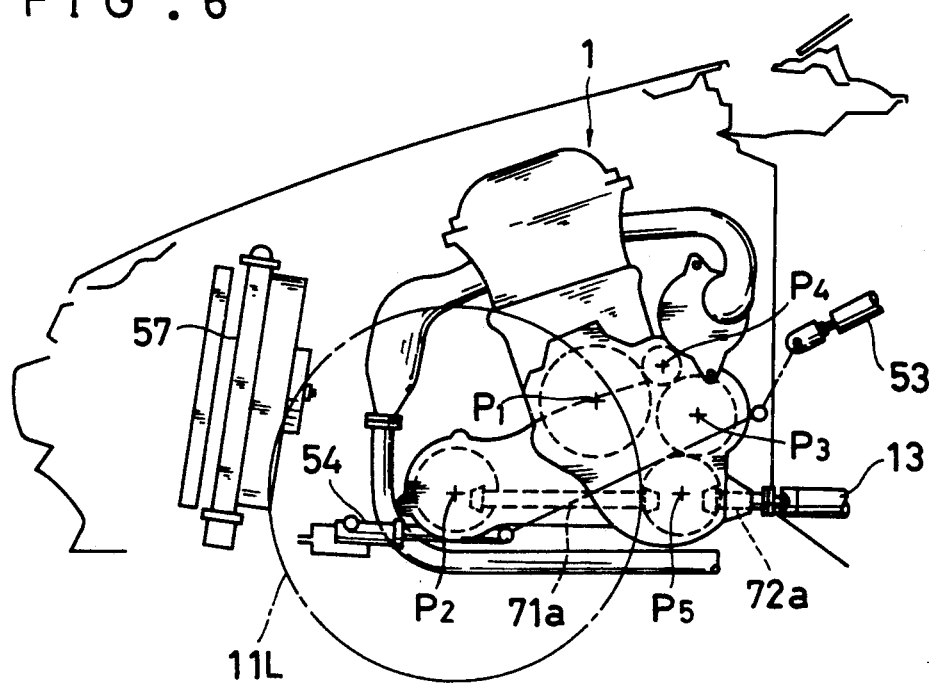

A positional relation of the engine 1 and the transmission 2 etc. at the front part of the vehicle body in the second embodiment is shown in FIGS. 5 and 6. An axial center of the main shaft 5 of the transmission 2 and a center P5 of the center differential 7 which is coaxial with the main shaft 5 are located at substantially the same height as a center P2 (an axial center of the axle shafts of the front wheels 11L and 11R) of the front differential 8, and also located in the rearward position of the center P2. An axial center P3 of a counter shaft 6 of the transmission 2 is located above the axial center P5 of the main shaft 5. An axial center P1 of a crank shaft 1a of the engine 1 is located substantially between the center P2 of the front differential 8 and the axial center P5 of the main shaft 5, and also located at substantially the same height as the axial center P3 of the counter shaft 6. An axial center P4 of an idle gear 62 is located between the axial center P1 of the crank shaft 1a and the axial center P3 of the counter shaft 6, as well as in the upper portion thereof.

A shaft 72a of the transfer mechanism 72 for the rear wheels and the propeller shaft 13 horizontally extend at the almost same height as the center P5 of the center differential 7 towards the rear of the vehicle body. A shaft 71a of the transfer mechanism 71 for the front wheels horizontally extends between the center differential 7 and the front differential 8 at the almost same height as the centers P5 and P2 thereof. When viewed in plane, the shaft 71a of the transfer mechanism 71 for the front wheels crosses the lower position of the engine 1 as shown in FIG. 4.

In this second embodiment, as in the case of the first embodiment, imbalanced distribution of vehicle weight on the front wheels 11L and 11R can be effectively corrected. Further, the power transmissions device does not extend considerably in the longitudinal direction, realizing a compact layout thereof. It is unnecessary to located the transmission 2 in the relatively upper position in order to avoid an interference with the shafts 71a and 72a of the transfer mechanisms 71 and 72 for the front and rear wheels. This means that the height of the bonnet can be set lower. However, it is necessary in the second embodiment to set the engine 1 in the relatively higher position in order to avoid an interference with the shaft 71a of the transfer mechanism 71 for the front wheels. Accordingly, the second embodiment is less effective in lowering a height of the bonnet than the first embodiment.

Figure 7:
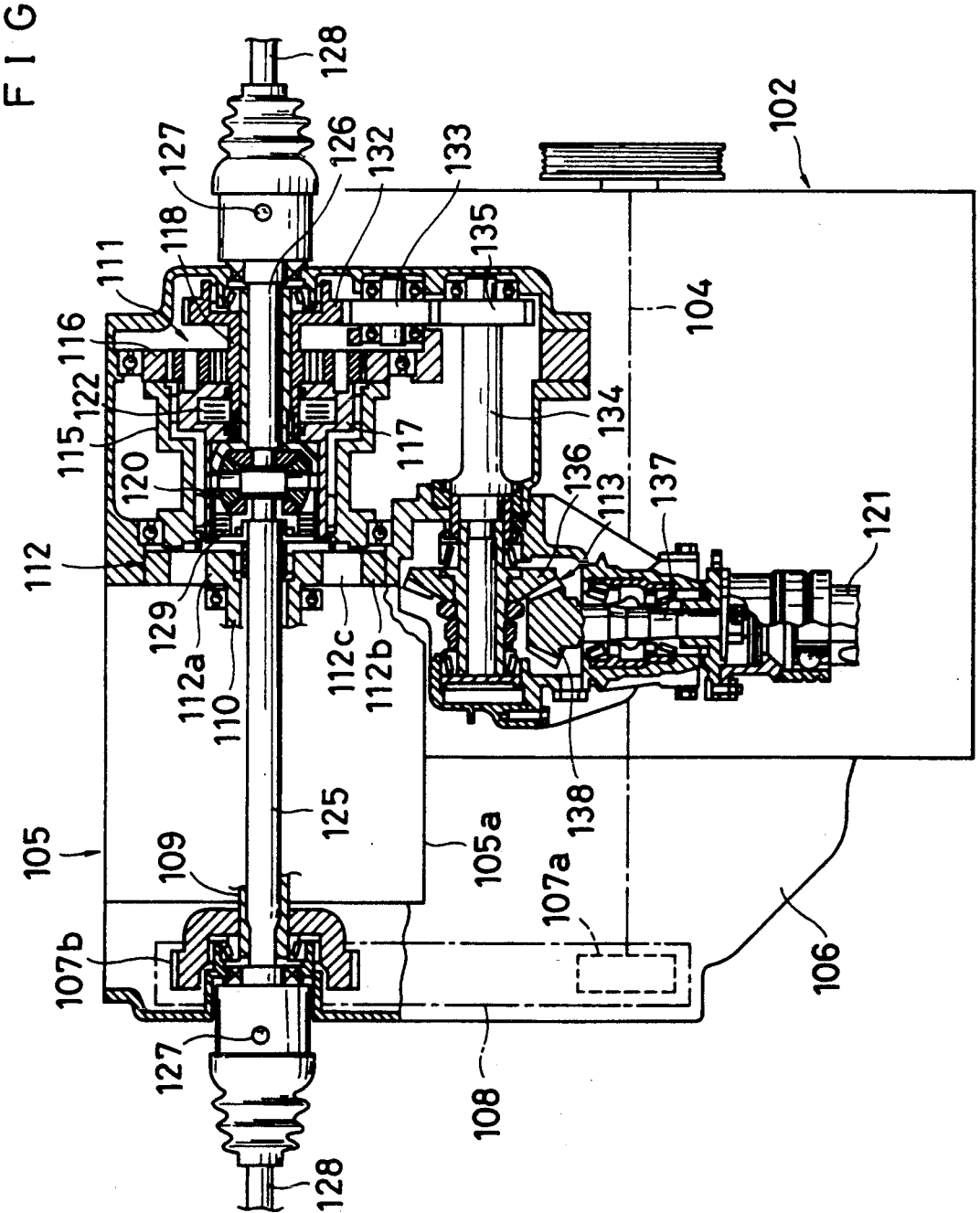
Figure 8:
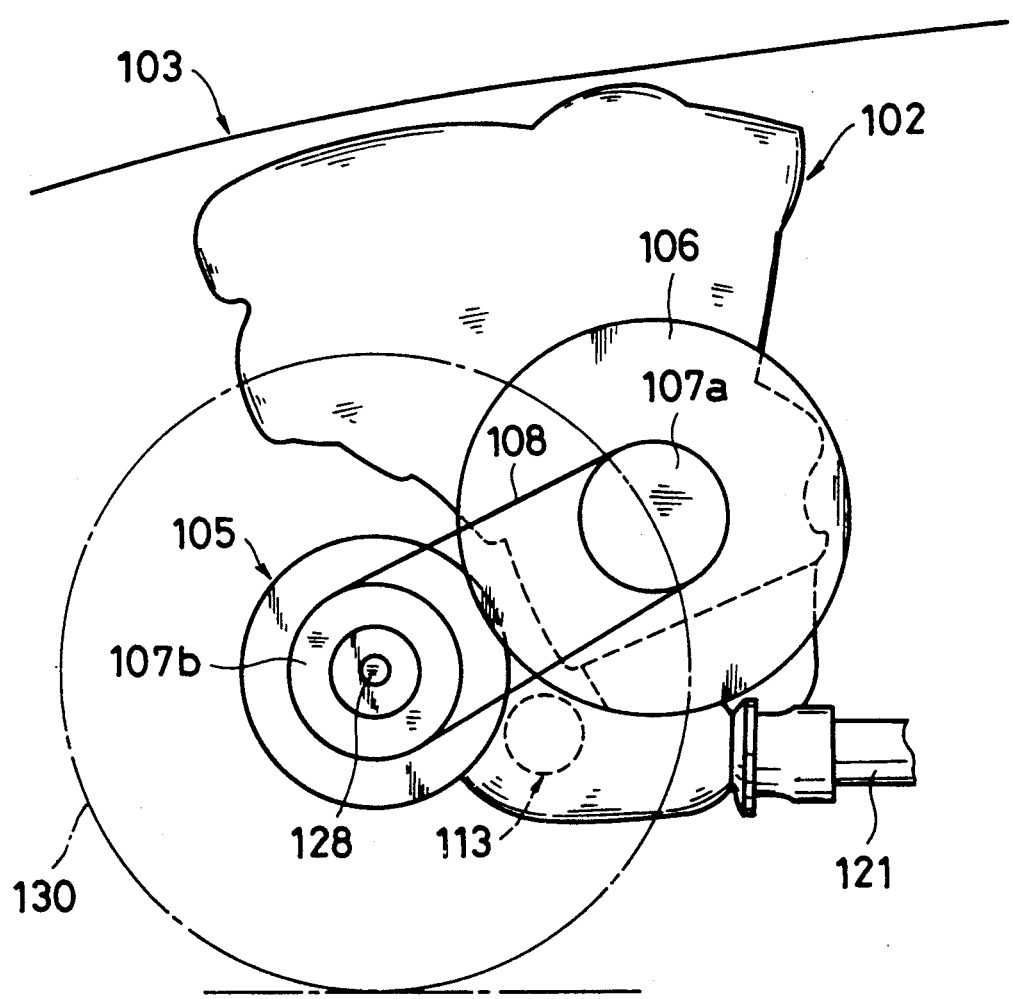

FIGS. 7 and 8 show a construction of a power transmission system in a four-wheel-drive motor vehicle in accordance with the third embodiment of the present invention. An upper portion illustrates a front side of the vehicle body in FIG. 7.

Referring now to FIGS. 7 and 8, an engine 102 is transversely disposed at the front part of the vehicle body 103 in such a way that an output shaft 104 extends in the widthwise direction of the vehicle body. A transmission 105 (an interior construction is not shown in the drawings) is also transversely disposed in front of the engine 102.

A clutch 106 is provided at one end (left end in the drawing) of the output shaft 104 of the engine 102. An output from this clutch 106 is transmitted from a clutch pulley 107a to a transmission pulley 107b by a belt 108 (or a chain). This transmission pulley 107b is provided at an input shaft 109 of the transmission 105 which is disposed in parallel to and in front of the clutch 106.

The transmission 105 has hollow input and output shafts 109 and 110. The input shaft 109 and the output shaft 110 are coaxially disposed in the widthwise direction of the vehicle body. One ends of the input shaft 109 and the output shaft 110 extend from a casing 105a to mutually opposed directions. Power outputted from the output shaft 110 after speed change is carried out is transmitted to the center differential 111 by means of a planetary reduction gear mechanism 112 located on one side of the transmission 105. A pinion 112c is interposed between a sun gear 112a formed on the transmission output shaft 110 and a fixed ring gear 112b on the outer periphery. This arrangement constitutes the reduction gear mechanism 112. Power which was decelerated by the speed reduction mechanism 112 is inputted from the pinion 112c through a connecting member 115 to an outer periphery ring gear 116 of the center differential 111.

The center differential 111 comprises a planetary gear type differential and is disposed coaxially with the transmission output shaft 110. The power inputted into the ring gear 116 of the center differential 111 is then divided into a pinion carrier 117 and a sun gear output shaft 118. A part of the power is outputted from the pinion carrier 117 to the front wheel side by means of a front differential 120 which is disposed on the side of the transmission 105. Meanwhile, the remaining power is outputted from the sun gear output shaft 118 to the rear wheel side by means of a transfer 113 and a propeller shaft 121. The center differential 111 constitutes a limited slip differential having a viscous coupling 122 for restricting a rotation differential between the pinion carrier 117 and the sun gear output shaft 118, namely, a rotation differential between the front and rear wheels.

The front differential 120 comprises a bevel gear type differential, and is positioned between the radiation gear mechanism 112 and the center differential 111 to be coaxial with the transmission output shaft 110. The power shaft 110. The power inputted from the pinion carrier 117 of the center differential 111 to the front differential 120 is then distributed to right and left output shafts 125 and 126 on both sides. These right and left output shafts 125 and 126 pass through the central parts of the transmission 105, the reduction gear mechanism 112 and the center differential 111 to extend in the transverse direction of the vehicle body. Rear ends of the output shafts 125 and 126 are interconnected with front drive shafts 128 and 128. These front drive shafts 128 and 128 are, in turn, connected to the right and left front wheels 130 (refer to FIG. 8) by means of ball joints 127 and 127. The front differential 120 constitutes a limited slip differential having a viscous coupling 129 for restricting a rotation differential between the right and left front wheels 130.

An output gear 132 is provided at the sun gear output shaft 118 of the center differential 111. Rotation is transmitted from this output gear 132 through an idle gear 133 to an input gear 135 of an input shaft 134 of the transfer 113. There is an engaging relation between a bevel gear 136 which is mounted on the input shaft 134 and a bavel gear 138 of a rear output shaft 137 which extends rearwardly to form a right angle the input shaft 134. The transfer 113 uses the engaging relation between the bavel gears 136 and 138 to change the rotational direction in order to transmit the rotation to the propeller shaft 121 located substantially at the center of the widthwise direction of the vehicle body.

The reduction gear mechanism 112 is provided in this third embodiment since it is required to carry out speed reduction on a coaxial line in the course of transmitting the power from the transmission 105, especially in the case of adopting a conventional differential device such as a front differential 120.

In the third embodiment of the present invention, the transmission 105 is disposed coaxially with the axle (the front drive shaft 128, and the right and left output shafts 125 and 126) of the front wheels 130. However, at the same time, the engine 102 is disposed in the rearward position of the axle of the front wheels 130. Accordingly, vehicle weight will not act excessively on the front wheels 130. Further, it is not required to locate the transmission 105 in relatively higher position to avoid an interference with the transfer 113, thus enabling the lower height of the bonnet.

The transmission 105 is disposed in front of the engine 102, and the reduction gear mechanism 112, the front differential 120 and the center differential 111 are coaxially positioned on one side of the transmission 105. Further, the transfer 113 (input shaft 134) is disposed inbetween the engine 102 and the transmission 105 at the lower part thereof. This arrangement leads to shorter longitudinal length of the power unit in contrast to the case where the transmission 105, the center differential 111 and the front differential 120 are not coaxially positioned. As a result, compact layout of the power unit can be realized. In addition, transverse width of the power unit can be minimized and the ball joints 127 on both sides can be placed on the central side of the vehicle body. With this arrangement, the front drive shaft 128 can be sufficiently long. As a result, running stability of the vehicle can be improved.

Figure 9:
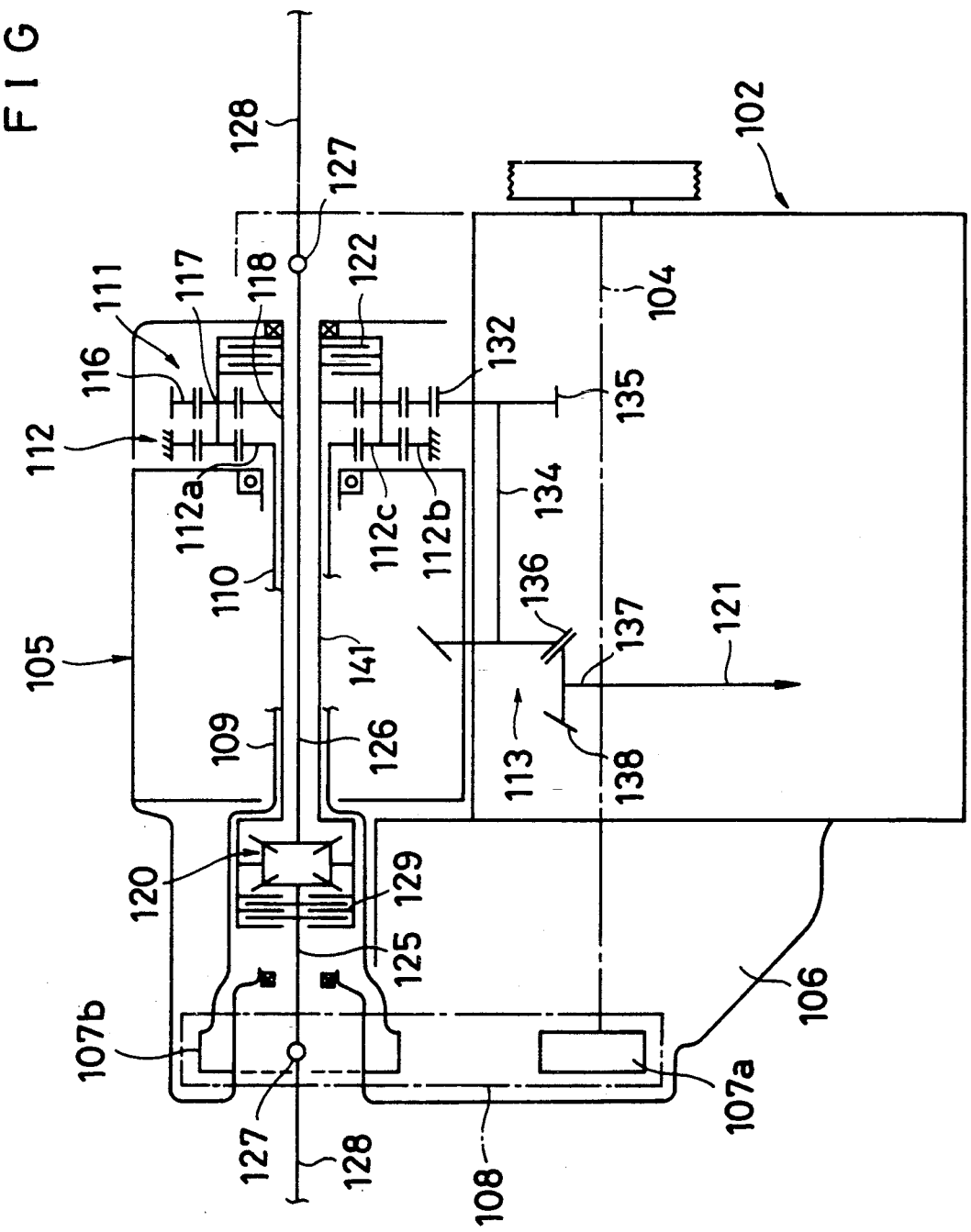

FIG. 9 shows a construction of a power transmission system in a four-wheel-drive motor vehicle in accordance with the fourth embodiment of the present invention. Same reference numerals as the third embodiment are given to the parts which have the same functions as the third embodiment although there is slight difference in construction between the third and fourth embodiments.

In the fourth embodiment, as in the case of the third embodiment, an engine 102 is transversely disposed at the front part of the vehicle body 103. A transmission 105 is also transversely disposed in front of the engine 102. This transmission 105 is located in front of a cylinder block to avoid an interference with a clutch 106 of the engine 102. As shown in FIG. 8, the transmission 105 is in the forward position of the clutch 106, but in a position more adjacent to the engine 102 than in the third embodiment. Under this arrangement, a transmission pulley 107b which makes contact with an input shaft 109 of the transmission 105 extends in a cylindrical form, and a belt 108 engages with this transmission pulley 107b at a portion corresponding to a clutch pulley 107a.

A front differential 120 is provided inside the transmission pulley 107b. A reduction gear mechanism 112 and a center differential 111 are mounted on an opposite side of the transmission 105, or an input side (a side an output shaft 110 extends). The output shaft 110 of the transmission 105 transmits the power after speed change is carried out to the center differential 111 by means of the reduction gear mechanism 112 of the planetary structure as in the case of the third embodiment.

The power which was decelerated at the reduction gear mechanism 112 is then outputted from a pinion 112c to a pinion carrier 117 of the center differential 111 of the planetary structure. Subsequently, the power is divided into a sun gear output shaft 118 and an outer periphery ring gear 116. A part of the power is transmitted from the sun gear output shaft 118 to the front wheel side by a through shaft 141 through the front differential 120 on the opposite side of the transmission 105. Meanwhile, the remaining power is transmitted from the ring gear 116 to the rear wheel side by means of a transfer 113 and a propeller shaft 121.

The front differential 120 comprises a bavel gear type differential. The power inputted from the sun gear output shaft 118 of the center differential to the front differential 120 is then outputted to right and left output shafts 125 and 126 on both sides. As in the case of the third embodiment, these right and left output shafts 125 and 126 pass through the central parts of the transmission 105, the reduction gear mechanism 112 and the center differential 111 to extend in the widthwise direction of the vehicle body. Meanwhile, an output gear 132 is provided on the outer periphery of the ring gear 116 of the center differential 111. This output gear 132 engages with an input gear 135 of an input shaft 134 of the transfer 113 in order to transmit the rotation.

Other construction of the fourth embodiment corresponds to that of the third embodiment. Therefore, same reference numerals as the third embodiment are given to the parts having the corresponding construction in the fourth embodiment, and explanation thereof is omitted.

According to the fourth embodiment, the transmission 105 is in a biased position from the front of the clutch 106 so as to shorten the distance between the engine output shaft 104 and the transmission output shaft 110. Consequently, higher bond strength therebetween is obtained. Additionally, compact disposition of the power unit with shorter longitudinal length thereof is realized, thereby correcting imbalanced weight distribution on the front wheels.

Further, in the fourth embodiment, a central shaft portion of the transmission 105 adopts a multiple-shaft structure, and the front differential 120 and the center differential 111 are separately provided on both sides of the transmission 105. With these arrangements, widthwise length of the power unit can be shortened to be located at the center of the vehicle body. Thus, the drive shaft 128 can be long enough instead. In addition, since a viscous coupling 122 of the center differential 111 is provided at an end portion of the power unit, later attachment of this viscous coupling 122 at an option is easily carried out.

Figure 10:
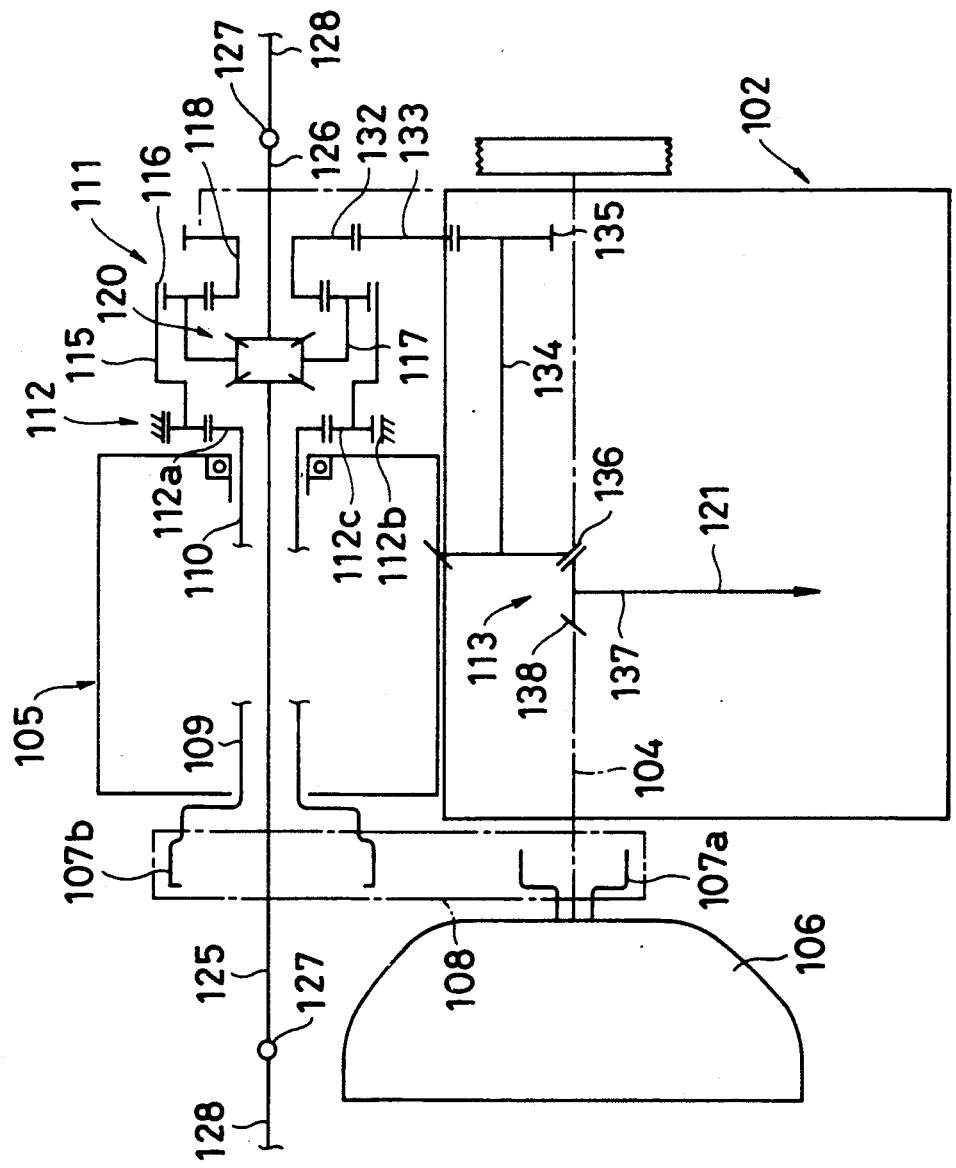

FIG. 10 shows a construction of a power transmission system of a four-wheel-drive motor vehicle in accordance with the fifth embodiment of the present invention. In this fifth embodiment, an engine 102 is transversely disposed at the front part of the vehicle body. A transmission 105 is also transversely disposed in front of the engine 102. A clutch 106 is separately disposed from the engine 102 so as to transmit a clutch output from therebetween to a transmission 105. Under this arrangement, the transmission 105 is disposed adjacent to the engine 102 while avoiding an interference with the clutch 106.

The power outputted from the engine 102 is inputted to the separate clutch 106 by the output shaft 104, and then transmitted from a clutch pulley 107a, which is located coaxially with this input portion, to a transmission pulley 107b by means of a belt 108. This transmission pulley 107b is provided at an input shaft 109 of the transmission 105.

The power transmission system subsequent to an output shaft 110 of the transmission 105 in the fifth embodiment corresponds to that of the third embodiment. Accordingly, the power is transmitted from a reduction gear mechanism 112 to a center differential 111 to be divided between the front and rear wheel sides. The power on the front wheel side is then transmitted from a front differential 120 to right and left output shafts 125 and 126 which pass through the transmission 105. Meanwhile, the power on the rear wheel side is transmitted from an idle gear 133 to a propeller shaft 121 by means of a transfer 113 etc.

Construction of other parts in the fifth embodiment is the same as in the case of the third embodiment. Therefore, same reference numerals as the third embodiment are given to the corresponding parts in the fifth embodiment, and explanation thereof is omitted.

According to the fifth embodiment, power is transmitted from a portion between the engine 102 and the clutch 106 to the transmission 105. Thus, it is possible to set the position of the transmission 105 at the central side of the vehicle in the widthwise direction of the vehicle body so that the front drive shaft 128 can be sufficiently long.

FIGS. 11 through 17 show a construction of a power transmission system of a four-wheel-drive motor vehicle in accordance with the sixth through twelfth embodiment of the present invention. These embodiments adopt the basic structure of the fifth embodiment. However, various modifications are made in positions of a center differential 111, a reduction gear mechanism 112, a front differential 120, and also a power transmission mechanism to a transfer 113 on both sides of the transmission 105. In accordance with a change in the positional relation of the above-mentioned elements, length of the front drive shaft 128 and a multiple-shaft structure at the central portion of the transmission 105 varies. The layout of the engine 102, clutch 106, the transmission 105, and the power transmission thereof coincide with the case of the fifth embodiment.

Figure 11:
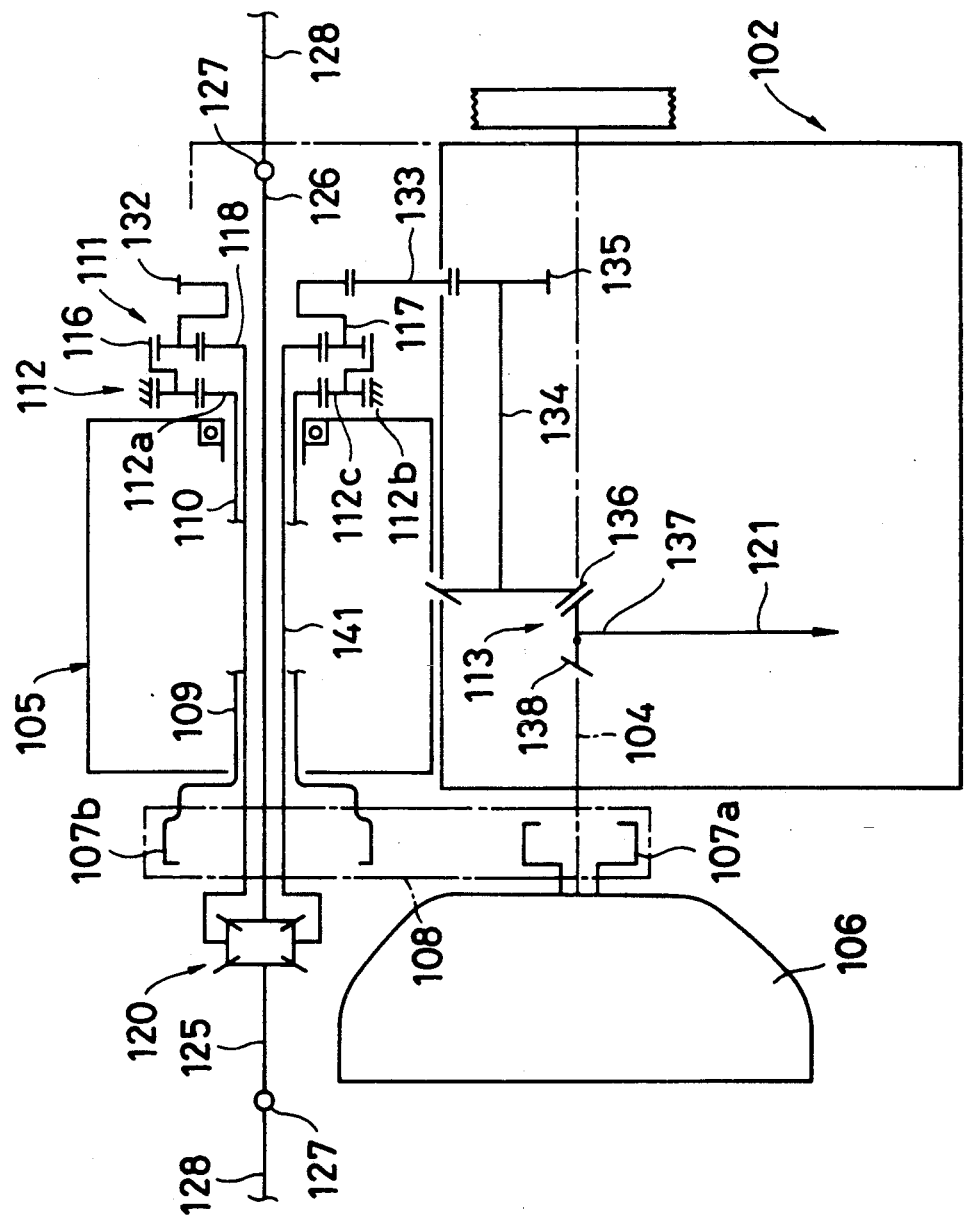

In the case of the sixth embodiment shown in FIG. 11, the following positional relation differs from the basic structure of the fifth embodiment. Namely, disposed on an input side (the side an input shaft 109 is extending) of the transmission 105 is the front differential 120, while disposed on an input side thereof (the side an output shaft 110 is extending) are a reduction gear mechanism 112 and a center differential 111.

The power outputted from the transmission 105 is reduced in its speed by the reduction gear mechanism 112. The power is then inputted to a ring gear 116 of the center differential 111 to be divided between a sun gear output shaft 118 on the front wheel side and a pinion carrier 117 on the rear wheel side. The power transmitted to the front wheel side is then transmitted from the sun gear output shaft 118 to a front differential 120 on the opposite side through a transmission 105 by a through shaft 141. Subsequently, the power is sent from the front differential 120 to right and left output shafts 125 and 126 which pass through the transmission 105. On the other hand, the power transmitted to the rear wheel side is sent from the pinion carrier 117 to a rearwardly-extending propeller shaft 121 by means of an idle gear 133 and a transfer 113 etc.

Construction of other parts in the sixth embodiment is the same as in the case of the fifth embodiment. Therefore, same reference numerals as the fifth embodiment are given to the corresponding parts in the sixth embodiment, and explanation thereof is omitted (the same can be applied to the following embodiments).

Figure 12:
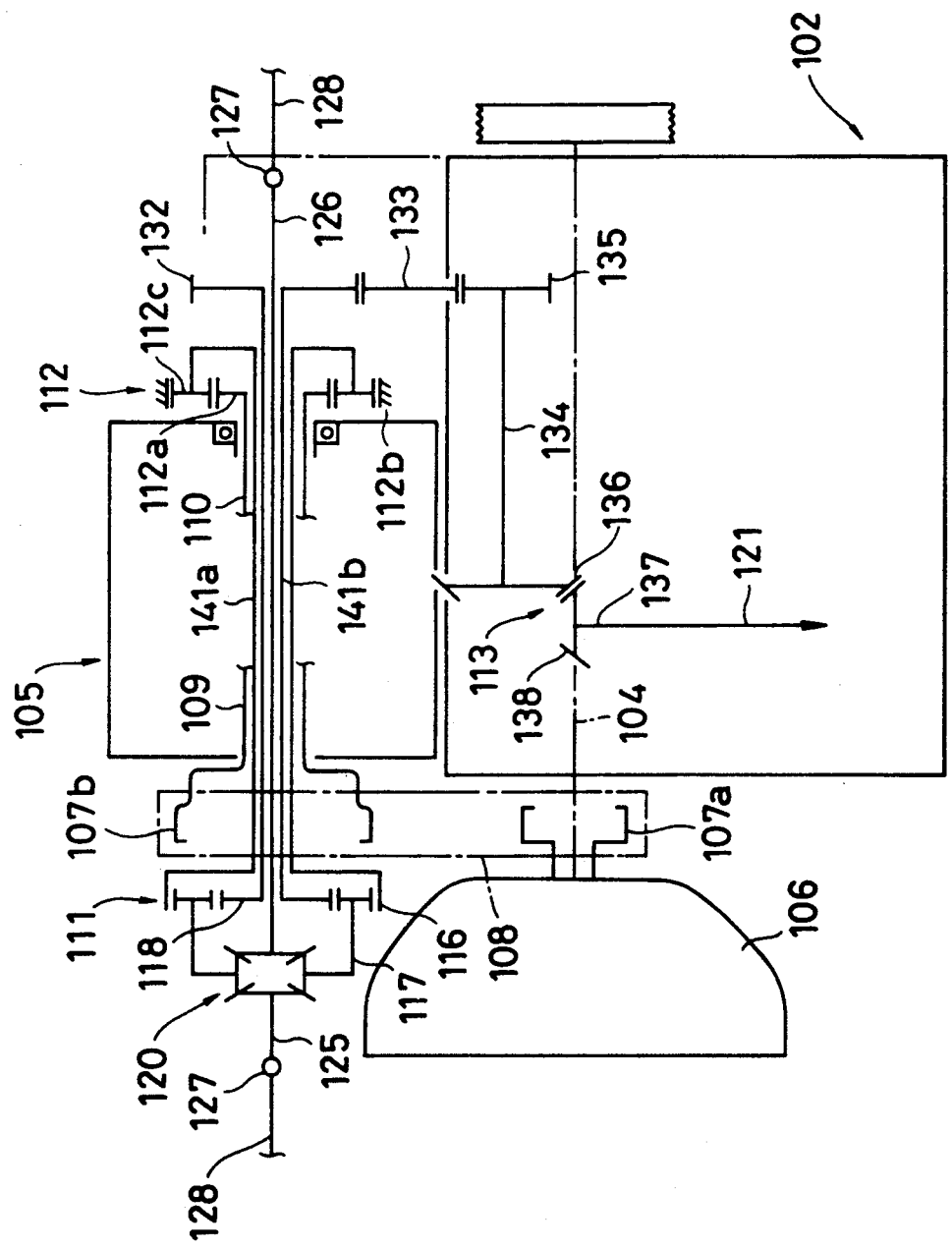

In the case of the seventh embodiment shown in FIG. 12, the following positional relation differs from the basic structure of the fifth embodiment. Namely, disposed on an input side of the transmission 105 are a center differential 111 and a front differential 120, while disposed on an output side thereof is a reduction gear mechanism 112.

The power outputted from the transmission 105 is reduced in its speed by the reduction gear mechanism 112, and then transmitted to the input side by a first through shaft 141a. Next, the power is inputted to a ring gear 116 of the center differential 111 to be divided between a pinion carrier 117 on the front wheel side and a sun gear output shaft 118 on the rear wheel side. The power on the front wheel side is transmitted from the pinion carrier 117 to right and left output shafts 125 and 126 by the front differential 120. On the other hand, the power on the rear wheel side is transmitted from the sun gear output shaft 118 to the output side by a second through shaft 141b. Then, the power is transmitted to a propeller shaft 121 by means of an idle gear 133 and a transfer 113 etc.

Figure 13:
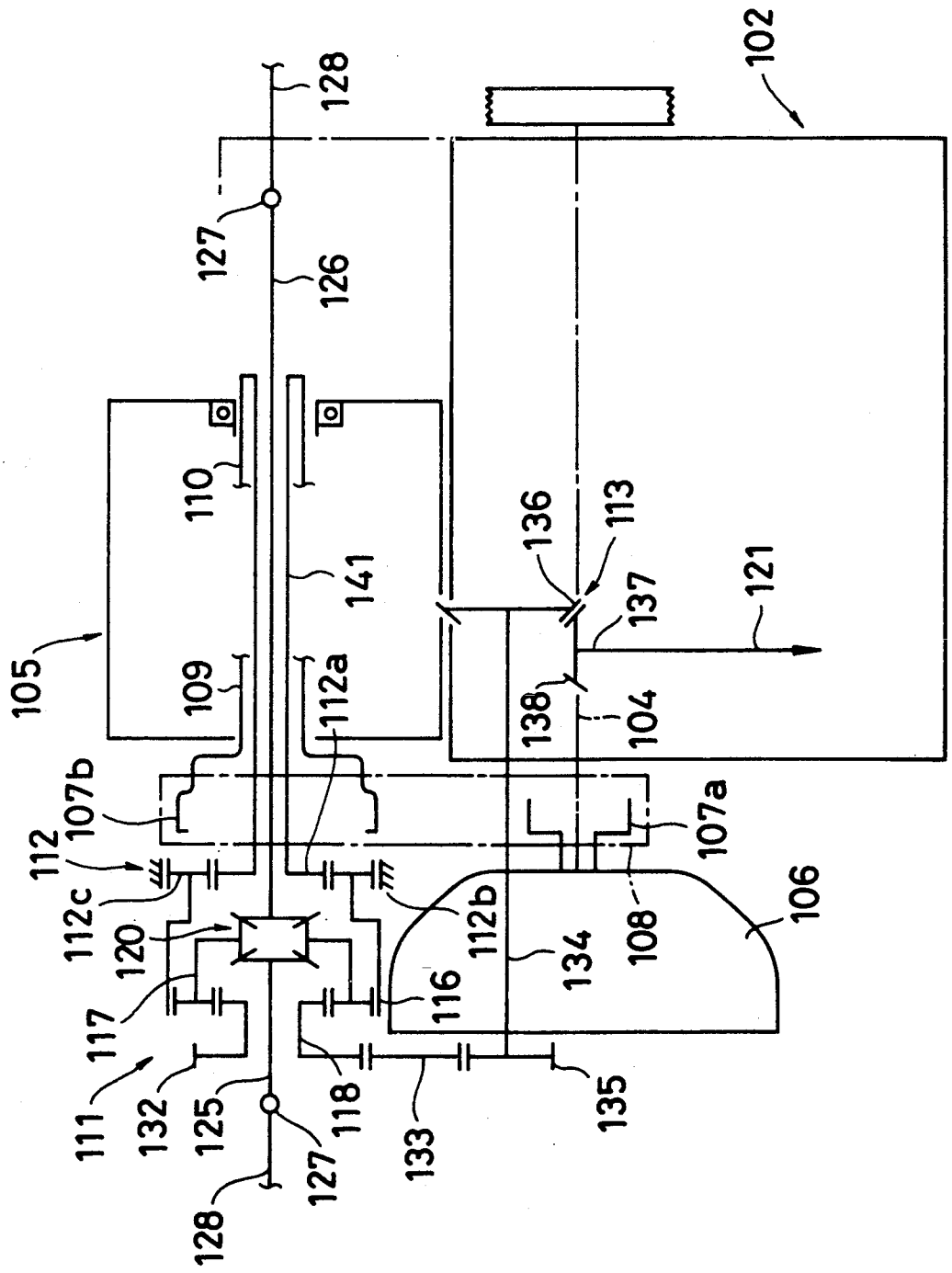

In the case of the eighth embodiment shown in FIG. 13, the following positional relation differs from the basic structure of the fifth embodiment. Namely, a reduction gear mechanism 112, a center differential 111 and a front differential 120 are disposed on an input side of the transmission 105.

The power outputted from the transmission 105 is transmitted to the input side by a through shaft 141a. After speed reduction is carried out by the reduction gear mechanism 112, the power is inputted to a ring gear 116 of the center differential 111 to be divided between a pinion carrier 117 on the front wheel side and a sun gear output shaft 118 on the rear wheel side. Then, the power on the front wheel side is transmitted from the pinion carrier 117 to right and left output shafts 125 and 126 by the front differential 120. On the other hand, the power on the rear wheel side is transmitted from the sun gear output shaft 118 directly to a propeller shaft 121 by means of an idle gear 133 and a transfer 113 etc.

Figure 14:
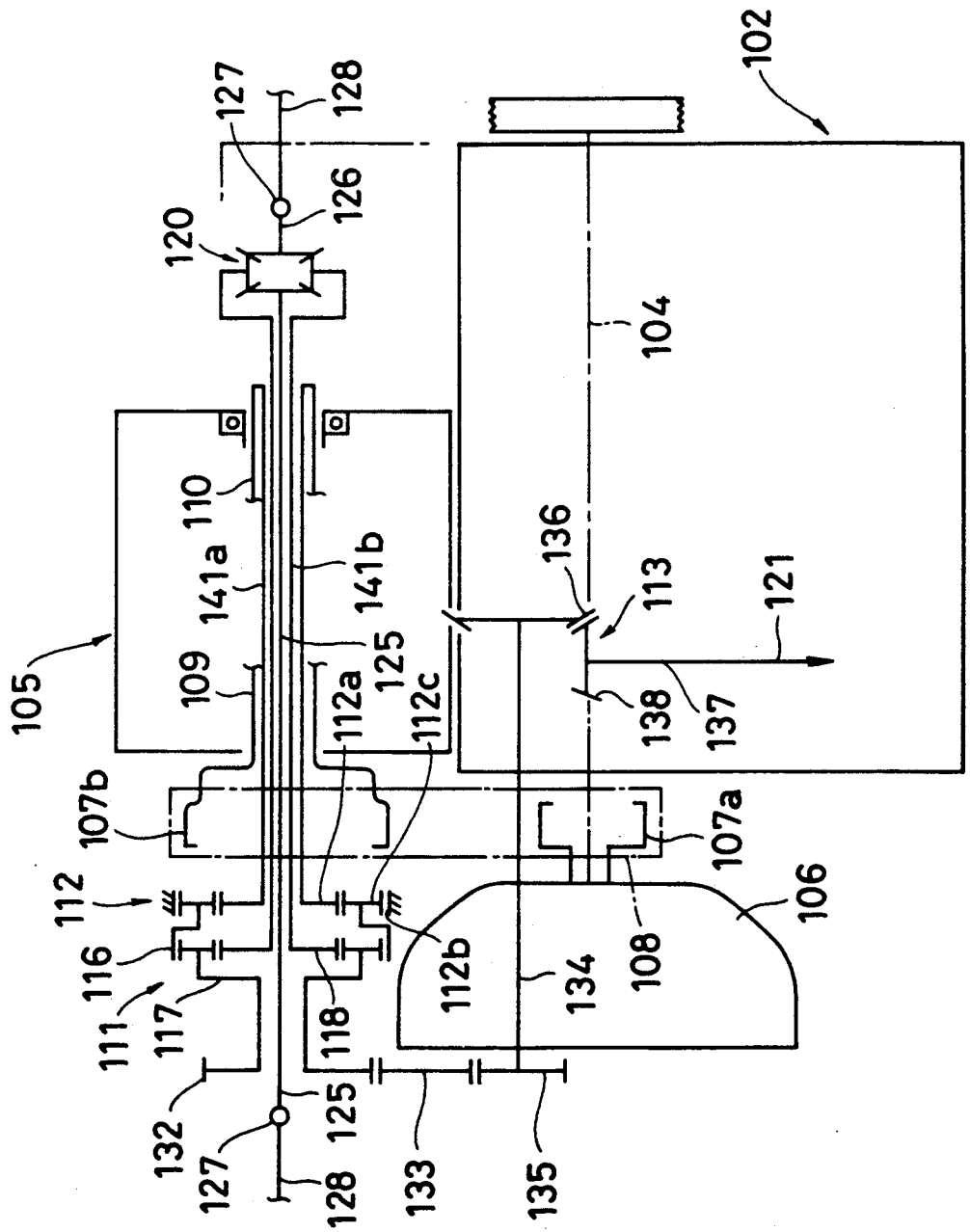

In the case of the ninth embodiment shown in FIG. 14, the following positional relation differs from the basic structure of the fifth embodiment. Namely, disposed on an input side of the transmission 105 are a center differential 111 and a reduction gear mechanism 112, while disposed on an output side thereof is a front differential 120.

The power outputted from the transmission 105 is transmitted to the input side by a first through shaft 141a. After speed reduction is carried out by the reduction gear mechanism 112, the power is inputted to a ring gear 116 of the center differential 111 to be divided between a sun gear output shaft 118 on the front wheel side and a pinion carrier 117 on the rear wheel side. Then, the power on the front wheel side is transmitted from the sun gear output shaft 118 to the output side by a second through shaft 141b, and further transmitted to right and left output shafts 125 and 126 by the front differential 120. On the other hand, the power on the rear wheel side is transmitted from the pinion carrier 117 to a propeller shaft 121 by means of an idle gear 133 and a transfer 113 etc.

Figure 15:
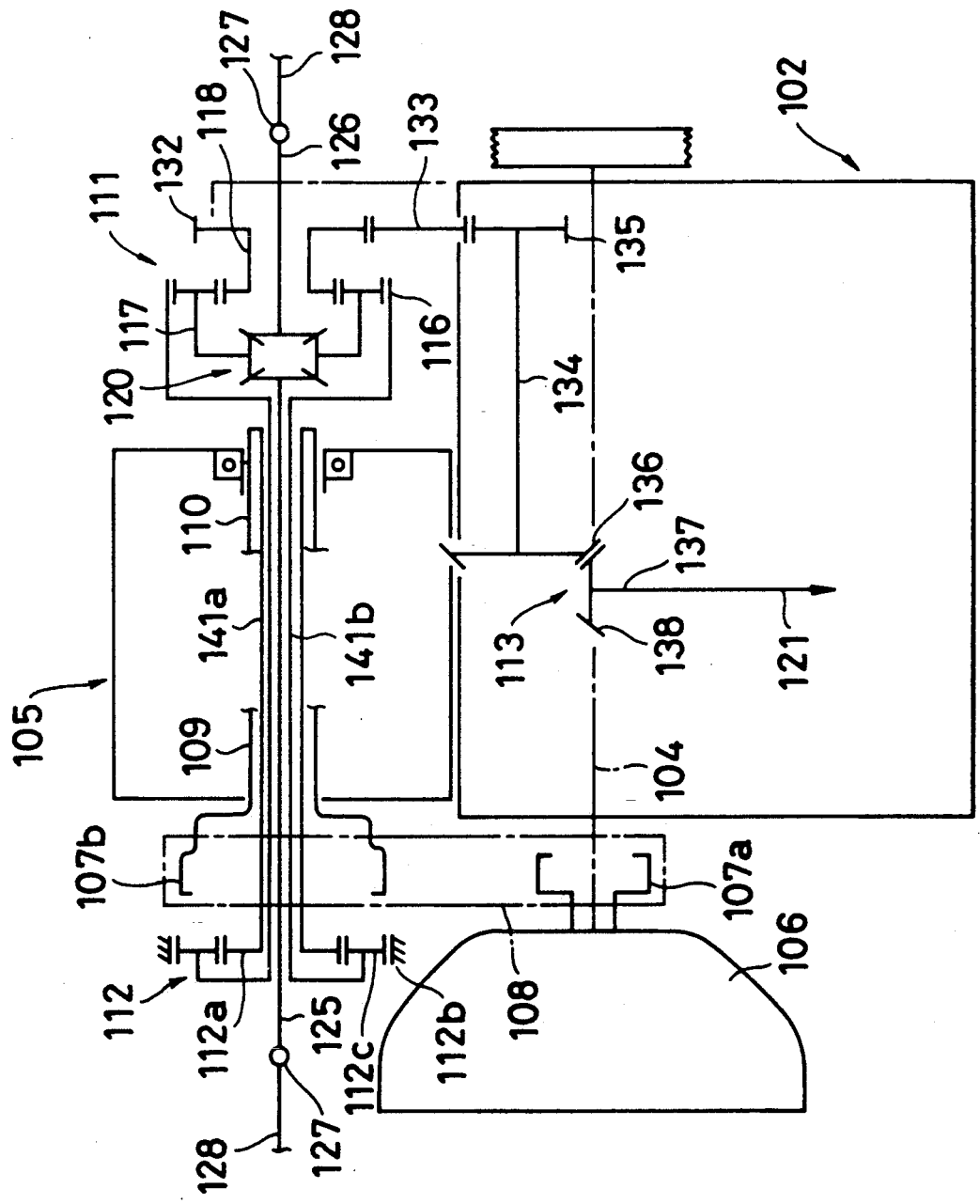

In the case of the tenth embodiment shown in FIG. 15, the following positional relation differs from the basic structure of the fifth embodiment. Namely, disposed on an input side of the transmission 105 is a reduction gear mechanism 112, while disposed on an output side thereof are a center differential 111 and a front differential 120.

The power outputted from the transmission 105 is transmitted to the input side by a first through shaft 141a. After speed reduction is carried out by the reduction gear mechanism 112, the power transmitted to the output side by a second through shaft 141b, and then inputted to a ring gear 116 of the center differential 111 to be divided between a pinion carrier 117 on the front wheel side and a sun gear output shaft 118 on the rear wheel side. Then, the power on the front wheel side is transmitted from the pinion carrier 117 to right and left output shafts 125 and 126 by the front differential 120. On the other hand, the power on the rear wheel side is transmitted from the sun gear output shaft 118 to a propeller shaft 121 by means of an idle gear 133 and a transfer 113 etc.

In the case of the eleventh embodiment shown in FIG. 16, the following positional relation differs from the basic structure of the fifth embodiment. Namely, disposed on an input side of the transmission 105 is a center differential 111, while disposed on an output side thereof are a reduction gear mechanism 112 and a front differential 120.

The power outputted from the transmission 105 is reduced in its speed by the reaction mechanism 112, and then transmitted to the input side by a first through shaft 141a. Next, the power is inputted to a ring gear 116 of the center differential 111 to be divided between a sun gear output shaft 118 on the front wheel side and a pinion carrier 117 on the rear wheel side. Then, the power on the front wheel side is transmitted from the sun gear output shaft 118 to the output side by a second through shaft 141b, and further transmitted to right and left output shafts 125 and 126 by the front differential 120. On the other hand, the power on the rear wheel side is transmitted from the pinion carrier 117 to a propeller shaft 121 by means of an idle-gear 133 and a transfer 113 et.

In the case of the twelfth embodiment shown in FIG. 17, the following positional relation differs from the basic structure of the fifth embodiment. Namely, disposed on an input side of the transmission 105 are a reduction gear mechanism 112 and a front differential 120, while disposed on an output side thereof is a center differential 111.

The power outputted from the transmission 105 is transmitted to the input side by a first through shaft 141a. After speed reduction is carried out by the reduction gear mechanism 112, the power is transmitted to the output side by a second through shaft 141b, and then is inputted to a ring gear 116 of the center differential 111 to be divided between a sun gear output shaft 118 on the front wheel side and a pinion carrier 117 on the rear wheel side. Then, the power on the front wheel side is transmitted from the sun gear output shaft 118 to the input side by a third through shaft 141c, and further transmitted to right and left output shafts 125 and 126 by the front differential 120. On the other hand, the power on the rear wheel side is transmitted from the pinion carrier 117 to a propeller shaft 121 by means of an idle gear 133 and a transfer 113 etc.

What is claimed is:

1. A four-wheel-drive motor vehicle, comprising: an engine and a transmission, both disposed transversely at a front part of a vehicle body, a center differential for distributing a driving torque from said transmission to a front wheel side and a rear wheel side, said transmission including an input shaft and an output shaft, said input shaft and said output shaft being arranged substantially parallel to one another;
wherein said engine and said transmission are disposed so as to be offset from each other in the longitudinal direction of the vehicle body and to locate a gravitational center of the engine and transmission combination in a rearward position of an axle of front wheels, said output shaft of said transmission extends in a transverse direction of the vehicle with said output shaft and said center differential disposed coaxially, and a transmission ratio is changed by switching a gear transmission channel between said input shaft and said output shaft.

2. A four-wheel-drive motor vehicle of transversely-disposed engine type as defined in claim 1 wherein said transmission is disposed in a forward position of said engine.

3. A four-wheel-drive motor vehicle of transversely-disposed engine type as defined in claim 2 wherein said transmission is disposed in a forward position of said engine, and said output shaft of said transmission is disposed coaxially with said center differential and a front differential.

4. A four-wheel-drive motor vehicle of transversely-disposed engine type as defined in claim 3 wherein both said center differential and said front differential are disposed on one side of said transmission in the widthwise direction of the vehicle body.

5. A four-wheel-drive motor vehicle of transversely-disposed engine type as defined in claim 3 wherein said center differential and said front differential are disposed separately on both sides of said transmission in the widthwise direction of the vehicle body.

6. A four-wheel-drive motor vehicle of transversely-disposed engine type as defined in claim 3 further comprising output means for outputting power from a portion between said engine and a clutch to said transmission.

7. A four-wheel-drive motor vehicle of transversely-disposed engine type as defined in claim 4 where an input shaft and an output shaft of said transmission extend from a casing to mutually opposed directions in the widthwise direction of the vehicle body, and said center differential and said front differential are disposed on a side where said output shaft extends.

8. A four-wheel-drive motor vehicle of transversely-disposed engine type as defined in claim 4 wherein an input shaft and an output shaft of said transmission extend from a casing to mutually opposed directions in the widthwise direction of the vehicle body, and said center differential and said front differential are disposed on a side where said input shaft extends.

9. A four-wheel-drive motor vehicle of transversely-disposed engine type as defined in claim 7 wherein both said center differential and front differential are provided respectively with a viscous coupling for restricting a rotational differential.

10. A four-wheel-drive motor vehicle of transversely-disposed engine type as defined in claim 7 further comprising a reduction gear mechanism which is provided between said output shaft of said transmission and said center differential in a power transmission channel.

11. A four-wheel-drive motor vehicle of transversely-disposed engine type as defined in claim 8 wherein both said center differential and front differential are provided respectively with a viscous coupling for restricting a rotational differential.

12. A four-wheel-drive motor vehicle of transversely-disposed engine type as defined in claim 8 further comprising a reduction gear mechanism which is provided between said output shaft of said transmission and said center differential in a power transmission channel.

13. A four-wheel-drive motor vehicle of transversely-disposed engine type as defined in claim 5 wherein both said center differential and front differential are provided respectively with a viscous coupling for restricting a rotational differential.

14. A four-wheel-drive motor vehicle of transversely-disposed engine type as defined in claim 5 further comprising a reduction gear mechanism which is provided between said output shaft of said transmission and said center differential in a power transmission channel.

15. A four-wheel-drive motor vehicle of transversely-disposed engine type as defined in claim 6 wherein said output means comprises a clutch pulley provided in an output portion of said clutch, a transmission pulley provided in said input shaft of said transmission, and a belt engaged with both said clutch pulley and transmission pulley.

16. A four-wheel-drive motor vehicle of transversely-disposed engine type as defined in claim 2 wherein said output shaft is disposed in a lower position in relation to said input shaft.

17. A four-wheel-drive motor vehicle of transversely-disposed engine type as defined in claim 16 wherein said output shaft is dispoed in a rearward position in relation to said input shaft.

18. A four-wheel-drive motor vehicle of transversely-disposed engine type as defined in claim 17 further comprising a shaft extending in the longitudinal direction of the vehicle body along a side of said engine in order to transmit said driving torque from said center differential to said rear wheel side.

19. A four-wheel-drive motor vehicle of transversely-disposed engine type as defined in claim 1 wherein said transmission is disposed in a rearward position of said engine.

20. A four-wheel-drive motor vehicle of transversely-disposed engine type as defined in claim 1 wherein said transmission is disposed in a forward position of said engine, and said output shaft is disposed in a lower position in relation to said input shaft.

21. A four-wheel-drive motor vehicle of transversely-disposed engine type as defined in claim 20 wherein said output shaft is disposed in a rearward position in relation to said input shaft.

22. A four-wheel-drive motor vehicle of transversely-disposed engine type as defined in claim 21 comprising a shaft extending in the longitudinal direction of the vehicle body along a side of said engine in order to transmit said driving torque from said center differential to said rear wheel side.

* * * * *